United States Patent
Hong (10) Patent No.: US 11,048,354 B2
(45) Date of Patent: Jun. 29, 2021

(54) TOUCH SENSOR AND TOUCH SENSING SYSTEM INCLUDING THE SAME

(71) Applicant: Samsung Display Co., Ltd., Yongin-si (KR)

(72) Inventor: Won Ki Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/861,927

(22) Filed: Jan. 4, 2018

(65) Prior Publication Data

US 2018/0188889 A1 Jul. 5, 2018

(30) Foreign Application Priority Data

Jan. 4, 2017 (KR) .................. 10-2017-0001494

(51) Int. Cl.
| | |
|---|---|
| *G06F 3/041* | (2006.01) |
| *G06F 3/0354* | (2013.01) |
| *G06F 3/045* | (2006.01) |
| *G06F 3/046* | (2006.01) |
| *G06F 1/16* | (2006.01) |

(52) U.S. Cl.
CPC ........ *G06F 3/04144* (2019.05); *G06F 1/1643* (2013.01); *G06F 3/03545* (2013.01); *G06F 3/045* (2013.01); *G06F 3/046* (2013.01); *G06F 3/0416* (2013.01); *G06F 2200/1632* (2013.01); *G06F 2203/04106* (2013.01)

(58) Field of Classification Search
CPC ...... G06F 3/044; G06F 3/045; G06F 3/03545; G06F 3/041–047
See application file for complete search history.

(56) References Cited

U.S. PATENT DOCUMENTS

| | | | |
|---|---|---|---|
| 4,878,553 A | 11/1989 | Yamanami et al. | |
| 5,691,513 A | 11/1997 | Yamamoto et al. | |
| 7,623,120 B2 | 11/2009 | Liu et al. | |
| 8,481,872 B2 | 7/2013 | Zachut | |
| 2011/0279402 A1* | 11/2011 | Yoo | G06F 3/044 345/174 |
| 2012/0227259 A1* | 9/2012 | Badaye | G06F 3/044 29/846 |
| 2014/0168113 A1* | 6/2014 | Abe | G06F 3/045 345/173 |
| 2015/0049052 A1* | 2/2015 | Atkinson | G06F 3/0416 345/174 |
| 2015/0103039 A1* | 4/2015 | Cho | G06F 3/044 345/174 |
| 2016/0011708 A1* | 1/2016 | Chung | G06F 3/0414 345/174 |
| 2016/0062517 A1 | 3/2016 | Meyer et al. | |

* cited by examiner

*Primary Examiner* — Hang Lin
(74) *Attorney, Agent, or Firm* — Lewis Roca Rothgerber Christie LLP (57) ABSTRACT

A touch sensor and a touch sensing system including the same. The touch sensor according to an embodiment may include a substrate having a first surface and a second surface opposite the first surface, a plurality of first electrodes on the first surface of the substrate, a plurality of second electrodes on the second surface of the substrate, and a plurality of coupling parts configured to couple the plurality of first electrodes to the plurality of second electrodes, respectively. Each of the first electrodes and the second electrodes has a spirally wound shape.

14 Claims, 5 Drawing Sheets

TOUCH SENSOR AND TOUCH SENSING SYSTEM INCLUDING THE SAME

CROSS-REFERENCE TO RELATED APPLICATION

The present application claims priority to and the benefit of Korean patent application number 10-2017-0001494, filed on Jan. 4, 2017, the entire disclosure of which is incorporated herein in its entirety by reference.

BACKGROUND

1. Field

Various embodiments of the present disclosure relate to a touch sensor and a touch sensing system including the touch sensor.

2. Description of Related Art

As the interest in information display rises and the demand for portable information media increases, research into and commercialization of display devices are being more actively conducted.

Recent display devices are each provided with a touch sensor for receiving a user's touch, and a display panel for displaying an image. Accordingly, the user may use (or utilize) various functions of display devices though the touching of his or her finger or a stylus pen.

SUMMARY

Aspects of various embodiments of the present disclosure are directed toward a touch sensor, which may sense both pressure and a resonance signal.

According to an embodiment of the present disclosure, a touch sensor includes a substrate having a first surface and a second surface opposite the first surface; a plurality of first electrodes on the first surface of the substrate; a plurality of second electrodes on the second surface of the substrate; and a plurality of coupling parts configured to couple the plurality of first electrodes to the plurality of second electrodes, respectively, wherein each of the first electrodes and the second electrodes has a spirally wound shape.

In an embodiment, the first electrodes and the second electrodes coupled to each other through the plurality of coupling parts, respectively, may overlap each other.

In an embodiment, each of the plurality of first electrodes may have a shape in which the first electrode is wound in a first direction, and each of the plurality of second electrodes may have a shape in which the second electrode is wound in a second direction opposite to the first direction.

In an embodiment, the coupling parts may be configured to couple center portions of the plurality of first electrodes to center portions of the plurality of second electrodes, respectively.

In an embodiment, the touch sensor may further include a plurality of first wires on the first surface of the substrate and coupled to the plurality of first electrodes, respectively; and a plurality of second wires on the second surface of the substrate and coupled to the plurality of second electrodes, respectively.

In an embodiment, the touch sensor may further include a sensor control unit configured to supply driving signals to the plurality of first wires and acquire sensing signals from the plurality of second wires, wherein the sensor control unit may be configured to calculate a location of a touch with reference to a resonance signal reflected in the sensing signals in a first mode, and calculate a location of a touch with reference to resistance variation reflected in the sensing signals in a second mode.

In an embodiment, when the driving signals are applied to the plurality of first wires, a direction of current flowing through each of the plurality of first electrodes may be the same as a direction of current flowing through each of the plurality of second electrodes.

According to an embodiment of the present disclosure, a touch sensing system includes a pen including a resonance circuit; and a touch sensor configured to sense a touch made by the pen, wherein the touch sensor includes a plurality of first electrodes on a first surface of a substrate; a plurality of second electrodes on a second surface of the substrate opposite the first surface; and a plurality of coupling parts configured to couple the plurality of first electrodes to the plurality of second electrodes, respectively, wherein each of the first electrodes and the second electrodes has a spirally wound shape.

In an embodiment, the touch sensor may be configured to operate in a first mode when a touch input is made by the pen and to operate in a second mode when the touch input is made by an object other than the pen.

In the first mode, each of the plurality of first electrodes and the plurality of second electrodes may transmit energy for allowing the resonance circuit to resonate to the pen.

In the second mode, each of the plurality of first electrodes and the plurality of second electrodes may function as a strain gauge.

In an embodiment, the first electrodes and the second electrodes coupled to each other through the plurality of coupling parts, respectively, may overlap each other.

In an embodiment, each of the plurality of first electrodes may have a shape in which the first electrode is wound in a first direction, and each of the plurality of second electrodes may have a shape in which the second electrode is wound in a second direction opposite to the first direction.

In an embodiment, the touch sensor may further include a plurality of first wires on the first surface of the substrate and coupled to the plurality of first electrodes, respectively; and a plurality of second wires on the second surface of the substrate and coupled to the plurality of second electrodes, respectively.

In an embodiment, the touch sensor may further include a sensor control unit configured to supply driving signals to the plurality of first wires and acquire sensing signals from the plurality of second wires, wherein the sensor control unit is configured to calculate a location of a touch with reference to a resonance signal reflected in the sensing signals in the first mode, and calculate a location of a touch with reference to resistance variation reflected in the sensing signals in the second mode.

In an embodiment, a direction of current flowing through each of the plurality of first electrodes may be the same as a direction of current flowing through each of the plurality of second electrodes.

DETAILED DESCRIPTION

The features and enhancements of the present disclosure will be more clearly understood from the following detailed description taken in conjunction with the accompanying drawings. However, the present disclosure is not limited to the following embodiments, and may be implemented in various different forms. In the following description, it will be understood that when an element or layer is referred to as being "on," "coupled to," or "connected to" another element or layer, it can be directly on, coupled to, or connected to the other element or layer or intervening elements or layers may be present. When an element is referred to as being "directly on," "directly coupled to," or "directly connected to" another element or layer, there are no intervening elements or layers present. As used herein, the term "and/or" includes any and all combinations of one or more of the associated listed items. For clear description of the present disclosure, descriptions of functions and configurations which are not related to the present disclosure will be omitted below. It should be noted that the same reference numerals are used to designate the same or similar elements throughout the drawings.

Hereinafter, a touch sensor and a touch sensing system including the touch sensor according to embodiments of the present disclosure will be described in more detail with reference to the accompanying drawings.

Figure 1:
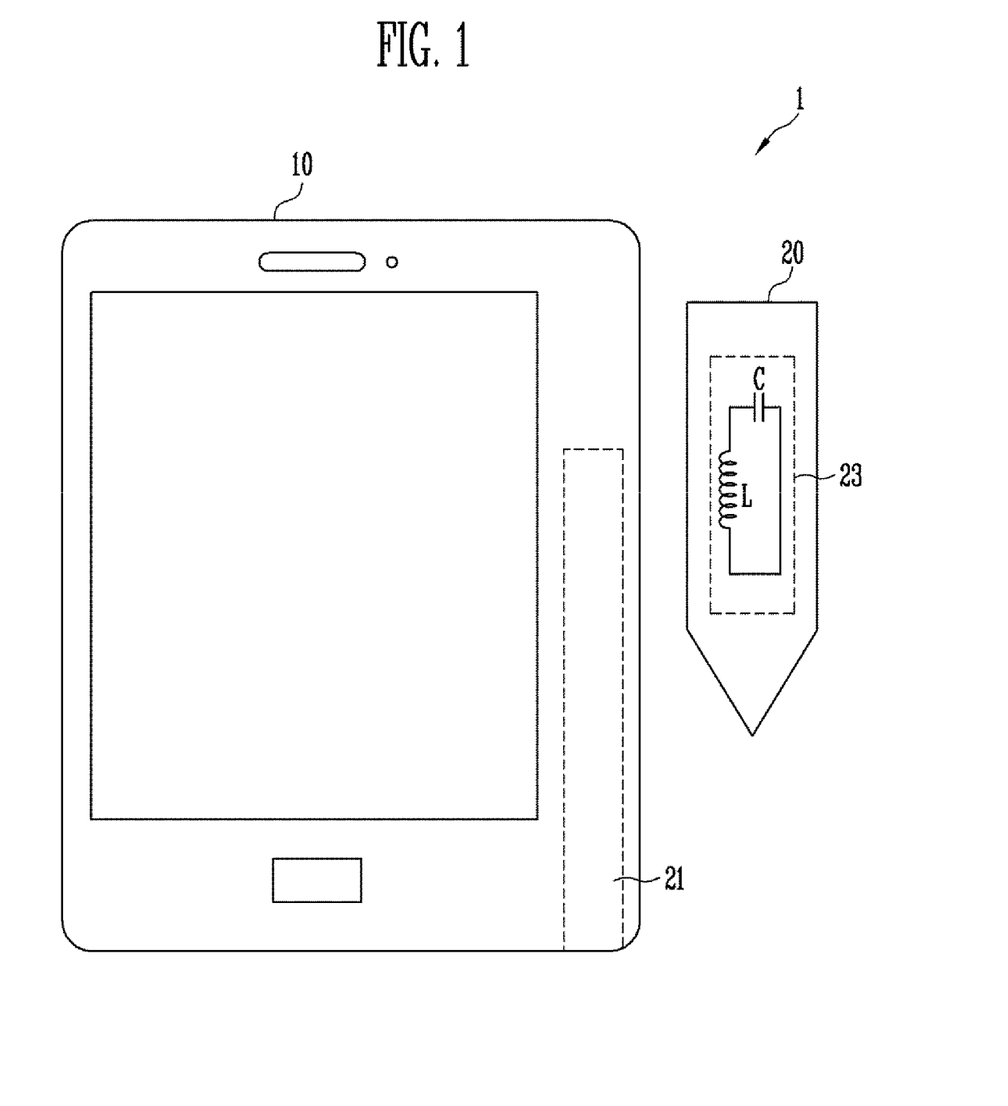
FIG. 1 is a diagram illustrating a touch sensing system according to an embodiment of the present disclosure.

FIG. 1 is a diagram illustrating a touch sensing system according to an embodiment of the present disclosure.

Referring to FIG. 1, a touch sensing system 1 according to an embodiment of the present disclosure may include a display device 10 and a pen 20.

The display device 10 may be any suitable one of electronic appliances equipped with a display panel (or display means), such as a smart phone, a tablet personal computer (PC), an electronic book reader, a computer, a workstation, a personal digital assistant (PDA), a portable multimedia player (PMP), or a camera.

The display device 10 may include a receiving part 21 in which the pen 20 may be accommodated. The user of the touch sensing system 1 may control (or manipulate) the display device 10 by taking the pen 20 accommodated in the receiving part 21 out of the display device 10.

The display device 10 may determine whether a touch input has been made by the pen 20 or by a (e.g., an additional) touch input object other than the pen 20 (e.g., the user's finger).

Accordingly, the display device 10 may decide on (e.g., select) a driving scheme for the driving signals and a processing scheme for processing the sensing signals in a manner corresponding to the touch input object.

For example, when the touch input has been made by the pen 20, the touch is processed (or sensed) according to a first mode, whereas when the touch input has been made by an object other than the pen 20, the touch may be processed (or sensed) according to a second mode.

When the pen 20 is separated from the receiving part 21, the display device 10 may function (e.g., automatically function) in the first mode, whereas when the pen 20 is accommodated in the receiving part 21, the display device 10 may function in the second mode.

Alternatively, depending on the user's settings, the display device 10 may function in the first mode or in the second mode.

The first mode may be driven according to an Electro-Magnetic Resonance (EMR) scheme, and the second mode may be driven according to a strain gauge scheme. For example, the driving scheme for the first mode may be an ElectroMagnetic Resonance (EMR) scheme, and the driving scheme for the second mode may be a strain gauge scheme.

In order to sense a touch in the EMR scheme in the first mode, the pen 20 may include a resonance circuit 23.

Although, for the convenience of description, the resonance circuit 23 is illustrated as having a single capacitor C and a single inductor L in FIG. 1, the configuration of the resonance circuit is not limited thereto, and the configuration of the resonance circuit 23 provided in the pen 20 may be variously changed. Further, according to the circumstances, the pen 20 may include a plurality of resonance circuits 23.

Figure 2:
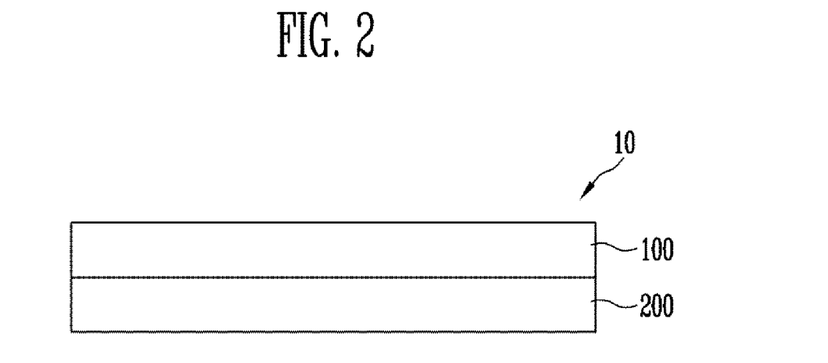
FIG. 2 is a diagram illustrating the configuration of the display device illustrated in FIG. 1.

FIG. 2 is a diagram illustrating the configuration of the display device 10 illustrated in FIG. 1.

Referring to FIG. 2, the display device 10 according to an embodiment of the present disclosure may include a display panel 100 and a touch sensor 200.

The display panel 100 may display an image and may be disposed on the touch sensor 200. However, the present disclosure is not limited to this structure, and the display panel 100 may be disposed beneath the touch sensor 200.

The touch sensor 200 may sense (e.g., detect) a touch input made via the display device 10 and may then calculate the location of the touch input.

After the display panel 100 and the touch sensor 200 may be separately formed, they may be attached to each other through an adhesive component. Alternatively, the touch sensor 200 may be formed to be embedded in the display panel 100.

Although not shown in FIG. 2, the display device 10 may further include a bracket or a window for accommodating and protecting the display panel 100 and the touch sensor 200.

Figure 3:
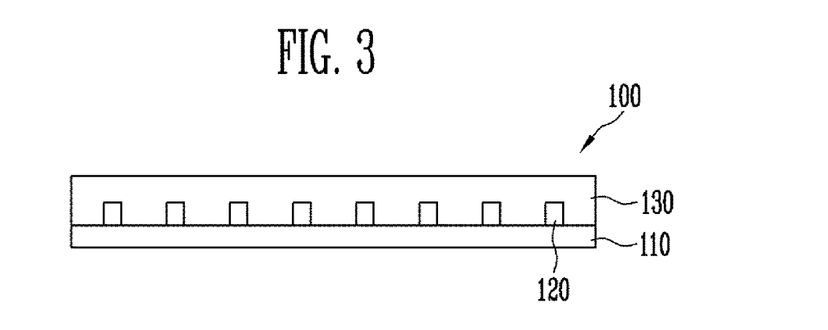
FIG. 3 is a diagram illustrating the configuration of the display panel illustrated in FIG. 2.

FIG. 3 is a diagram illustrating the configuration of the display panel 100 illustrated in FIG. 2.

Referring to FIG. 3, the display panel 100 according to an embodiment of the present disclosure may include a substrate 110, a plurality of pixels 120, and an encapsulation layer 130.

The plurality of pixels 120 may be disposed on the substrate 110. Further, the encapsulation layer 130 may be disposed on the pixels 120 and the substrate 110.

For example, the substrate 110 may be made of an insulating material such as glass or resin. Further, the substrate 110 may be made of a material having flexibility so that it is bendable and/or foldable, and may have a single-layer structure or a multi-layer structure.

For example, the substrate 110 may be made of a material including at least one selected from polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material used (or utilized) to form the substrate 110 may be variously changed, and may also be made of, for example, fiberglass-reinforced plastic (FRP) or the like.

The pixels 120 may emit light under the control of a display driving unit, and may be protected by the encapsulation layer 130.

For example, the encapsulation layer 130 may reduce or prevent moisture, oxygen, etc. from permeating into the pixels 120.

Here, the encapsulation layer 130 may include at least one of glass, an organic material, or an inorganic material, and may have a single-layer structure or a multi-layer structure.

For example, the encapsulation layer 130 may have a multi-layer structure including at least one organic layer and at least one inorganic layer.

An organic insulating material, for example, a polyacrylic compound, a polyimide compound, a fluorocarbon compound such as Teflon, a polyepoxy compound, or a benzocyclobutene (BCB) compound, may be used (or utilized) as the material of the organic layer. An inorganic insulating material, for example, polysiloxane, silicon nitride, silicon oxide, or metal oxide including aluminum oxide, may be used (or utilized) as the material of the inorganic layer.

Figure 4:
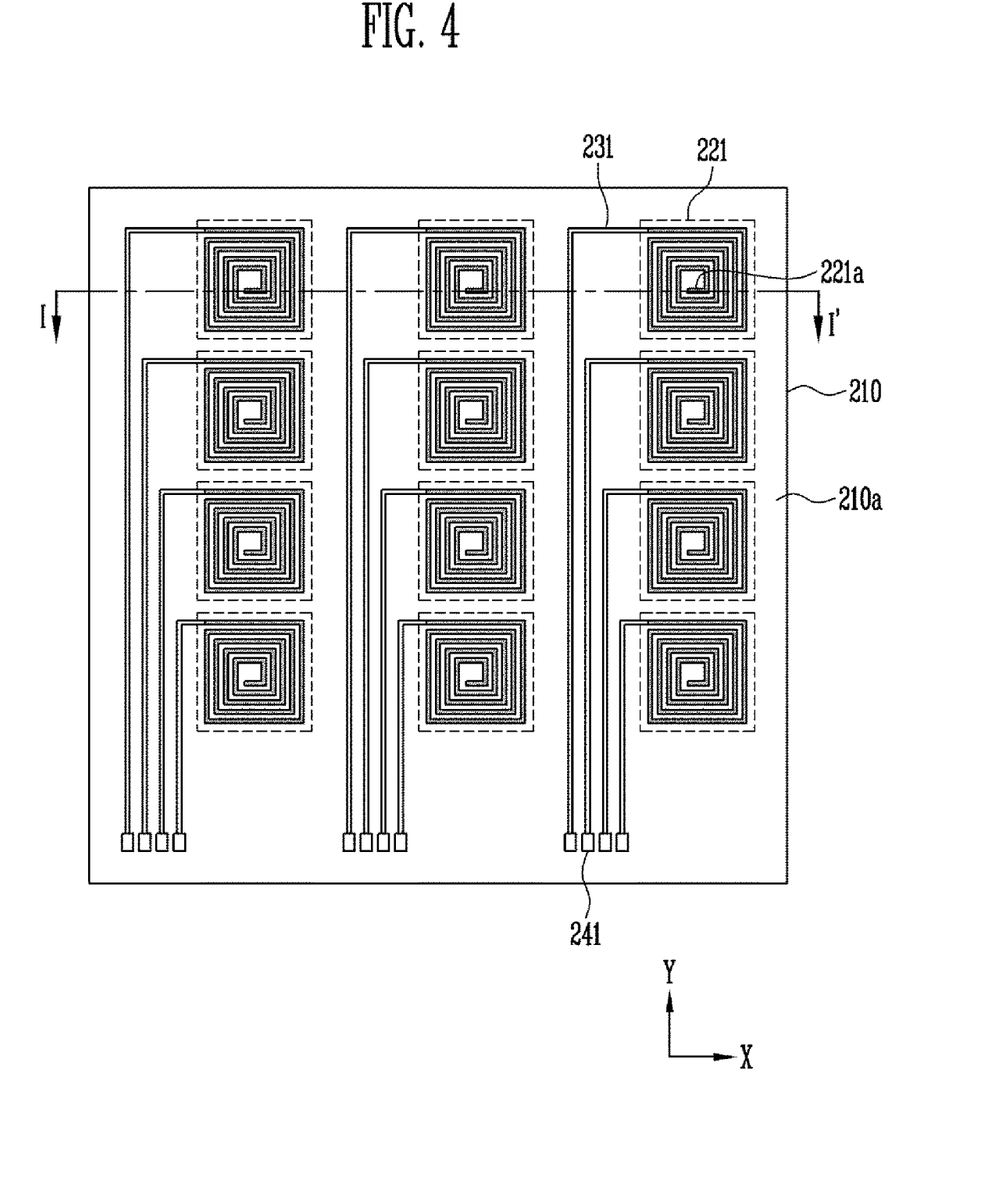
FIG. 4 is a diagram illustrating the configuration of a first surface of the touch sensor illustrated in FIG. 2.
Figure 5:
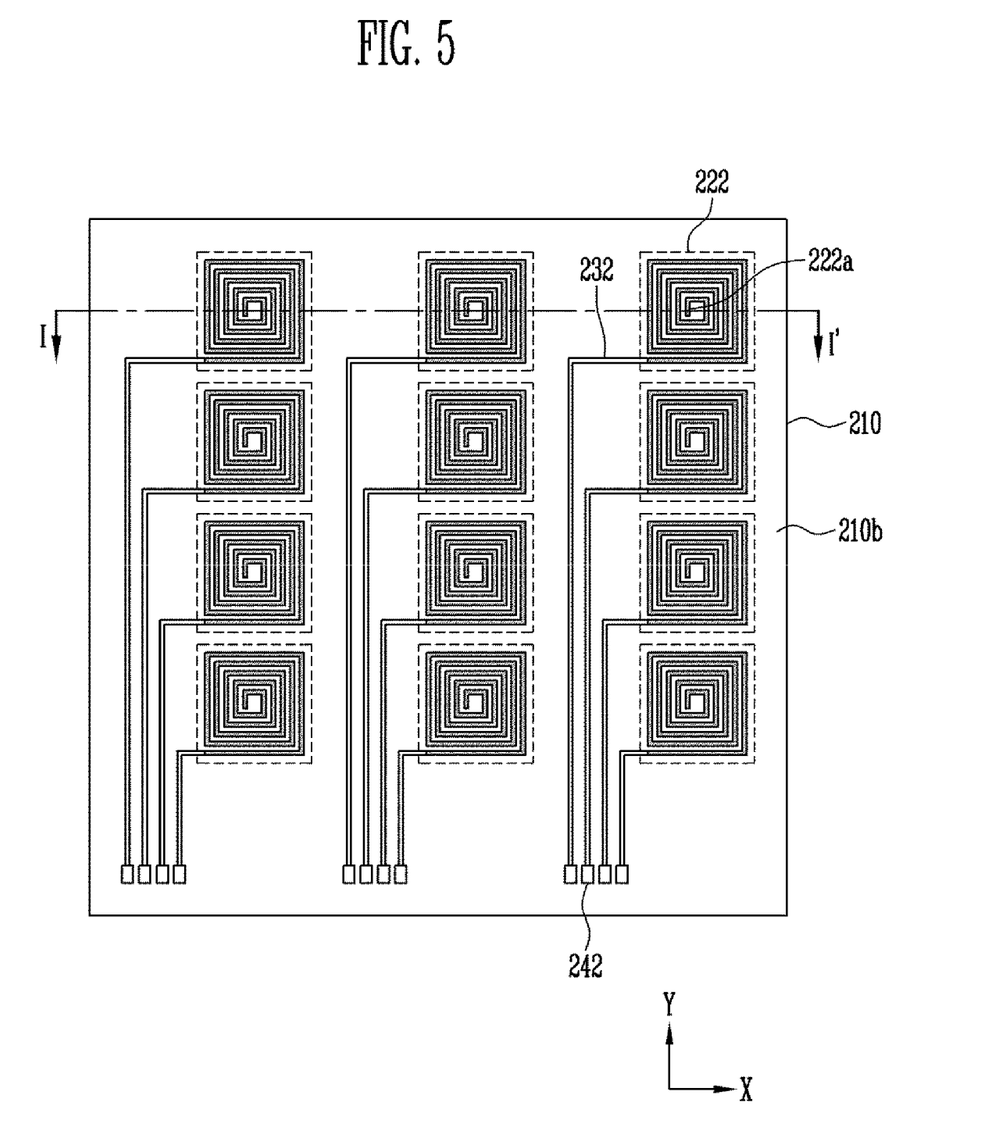
FIG. 5 is a diagram illustrating the configuration of a second surface of the touch sensor illustrated in FIG. 2.
Figure 6:
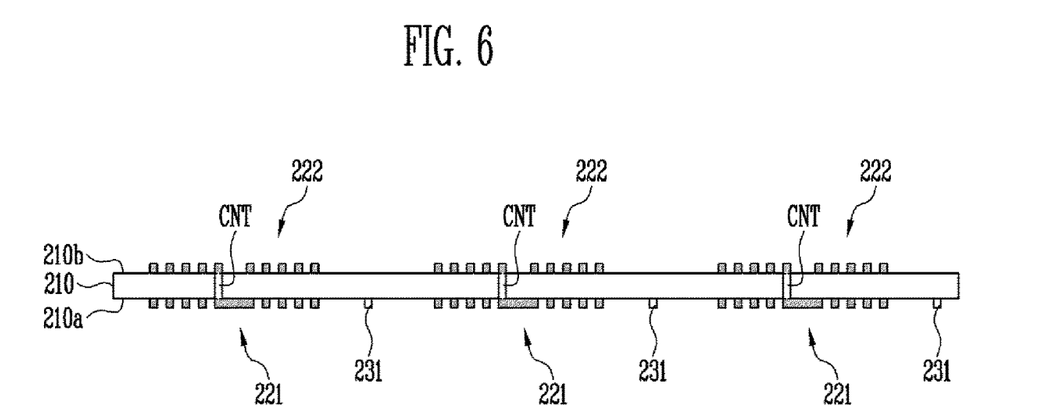
FIG. 6 is a sectional view taken along the line I-I' of FIGS. 4 and 5.

FIGS. 4 to 6 are diagrams illustrating the configuration of the touch sensor 200 illustrated in FIG. 2.

In particular, FIG. 4 illustrates a first surface of the touch sensor 200, FIG. 5 illustrates a second surface of the touch sensor 200, and FIG. 6 is a sectional view taken along line I-I' of FIGS. 4 and 5.

Referring to FIGS. 4 to 6, the touch sensor 200 may include a substrate 210, first electrodes (i.e., a plurality of first electrodes) 221, second electrodes (i.e., a plurality of second electrodes) 222, first wires (i.e., a plurality of first wires) 231, and second wires (i.e., a plurality of second wires) 232.

The substrate 210 may be formed of a material substantially similar (or identical) to the ones described above in connection with substrate 110 with reference to FIG. 3. Therefore, a detailed description of the substrate 210 will be omitted here.

The first electrodes 221 may be disposed on a first surface 210a of the substrate 210.

The first electrodes 221 may each include a conductive material sensitive to pressure so that physical properties (e.g., length, cross-sectional area, resistance value, etc.) thereof are changed due to the pressure. For example, a resistance value of the first electrodes may change in response to pressure.

For example, a metal material, an alloy of metal materials, a conductive polymer, a conductive metal oxide, or the like may be used (or utilized) as the conductive material.

The first electrodes 221 may each be implemented using (or utilizing) a metal nanowire.

In an embodiment of the present disclosure, examples of the metal material may include copper, silver, platinum, palladium, nickel, tin, aluminum, cobalt, rhodium, iridium, iron, ruthenium, osmium, manganese, molybdenum, tungsten, niobium, tantalum, titanium, bismuth, antimony, lead, etc. Further, examples of the conductive polymer may include polythiophene, polypyrrole, polyaniline, polyacetylene and/or polyphenylene compounds, and/or mixtures thereof. In one embodiment, among the polythiophene compounds, poly-3,4-ethylenedioxythiophene/polystyrenesulfonate (PEDOT/PSS) compounds may be used (or utilized).

Examples of the conductive metal oxide may include indium tin oxide (ITO), indium zinc oxide (IZO), antimony zinc oxide (AZO), indium tin zinc oxide (ITZO), zinc oxide (ZnO), tin oxide (SnO2), etc.

In addition, the first electrodes 221 may each be made of graphene, a carbon nanotube, etc.

In an embodiment of the present disclosure, the first electrodes 221 may be implemented as a single-layer structure or a multi-layer structure.

The first electrodes 221 may be arranged in the form of a matrix along a first direction (e.g., an X axis direction) and a second direction (e.g., a Y axis direction).

Although, for the convenience of description, it is illustrated in FIG. 4 that three first electrodes 221 are arranged along the first direction (X axis direction) and four first electrodes 221 are arranged along the second direction (Y axis direction), the number of first electrodes 221 provided in the touch sensor 200 may be variously changed.

Each of the first electrodes 221 may have a spiral shape. In more detail, the first electrode 221 may have a shape in which a line forming the corresponding first electrode 221 is wound around a first center portion 221a at least once.

In addition, although each first electrode 221 is illustrated as having a rectangular spiral shape in FIG. 4, the present disclosure is not limited thereto, and each first electrode 221 may have the shape of a curved line.

The first wires 231 may be disposed on the first surface 210a of the substrate 210 and may be coupled to the first electrodes 221, respectively.

The first wires 231 may be interposed between first pads 241 and the first electrodes 221, and may be extended from the corresponding first electrodes 221 along the second direction (Y axis direction) and then be electrically coupled to the corresponding first pads 241.

The first wires 231 may function to transfer driving signals (from the first pads 241) to the first electrodes 221.

The first wires 231 and the first pads 241 may include conductive materials.

In addition, although each first electrode 221 and the first wire 231 corresponding thereto are illustrated as being separate components in FIG. 4, the configuration of the present disclosure is not limited thereto, and the first electrode 221 and the first wire 231 may be formed to be integrated with each other.

Referring to FIG. 5, the second electrodes 222 may be disposed on the second surface 210b of the substrate 210.

The second surface 210b of the substrate 210 may face the first surface 210a on which the first electrodes 221 are disposed.

The second electrodes 222 may each include a conductive material sensitive to pressure so that physical properties (e.g., length, cross-sectional area, resistance value, etc.) thereof are changed due to the pressure. For example, a resistance value of the second electrodes may change in response to pressure. For example, a metal material, an alloy of metal materials, a conductive polymer, a conductive metal oxide, or the like may be used (or utilized) as the conductive material.

The second electrodes 222 may each be implemented using (or utilizing) a metal nanowire. Further, the second electrodes 222 may each be made of graphene, a carbon nanotube, or the like.

The second electrodes 222 may be made of a material that is the same as (i.e., identical to) that of the first electrodes 221 or a material different from that of the first electrodes 221.

The number of second electrodes 222 may be the same as (i.e., identical to) the number of first electrodes 221.

The second electrodes 222 may be arranged in the form of a matrix along a first direction (e.g., an X axis direction) and a second direction (e.g., a Y axis direction).

Although, for the convenience of description, it is illustrated in FIG. 5 that three second electrodes 222 are arranged along the first direction (X axis direction) and four second electrodes 222 are arranged along the second direction (Y axis direction), the number of second electrodes 222 provided in the touch sensor 200 may be variously changed.

Each of the second electrodes 222 may have a spiral shape. In more detail, the second electrode 222 may have a shape in which a line forming the corresponding second electrode 222 is wound around a second center portion 222a at least once.

In addition, although each second electrode 222 is illustrated as having a rectangular spiral shape in FIG. 5, the present disclosure is not limited thereto, and each second electrode 222 may have the shape of a curved line.

The second wires 232 may be disposed on the second surface 210b of the substrate 210 and may be coupled to the second electrodes 222, respectively.

The second wires 232 may be interposed between second pads 242 and the second electrodes 222, and may be extended from the corresponding second electrodes 222 along the second direction (Y axis direction) and then be electrically coupled to the corresponding second pads 242.

The second wires 232 may function to transfer signals, output from the second electrodes 222, to the second pads 242.

The second wires 232 and the second pads 242 may include conductive materials.

The second wires 232 may be made of a material that is the same as (i.e., identical to) that of the first wires 231 or a material different from that of the first wires 231. Further, the second pads 242 may be made of a material that is the same as (i.e., identical to) that of the first pads 241 or a material different from that of the first pads 241.

In addition, although each second electrode 222 and the second wire 232 corresponding thereto are illustrated as being separate components in FIG. 5, the configuration of the present disclosure is not limited thereto, and the second electrode 222 and the second wire 232 may be formed to be integrated with each other.

Referring to FIG. 6, when viewed from a plane, the first electrodes 221 may be disposed to overlap the second electrodes 222, respectively. For example, a first electrode 221 on the first surface of the substrate 210 may overlap with a corresponding second electrode 222 on the second surface of the substrate 210 completely.

The first center portions 221a of the first electrodes 221 may be electrically coupled to the second center portions 222a of the second electrodes 222 through coupling parts CNT, respectively.

Each of the coupling parts CNT may be formed in such a way that a hole is formed in the substrate 210 and is filled with a conductive material. Respective holes may be formed at the locations where the first center portions 221a overlap the second center portions 222a corresponding thereto.

Through respective coupling parts CNT, the first electrodes 221 may be electrically coupled to the second electrodes 222, which are disposed to overlap the first electrodes 221.

Accordingly, when driving signals (from the first pads 241) are supplied to the first electrodes 221 through the first wires 231, the driving signals may be output through the second wires 232 via the second electrodes 222.

That is, when a touch input is not made, signals output through the second wires 232 may be identical to or similar (e.g., substantially similar) to the driving signals.

On the other hand, when a touch input is made, signals (e.g., resonance signal, which may include a resonance frequency and/or magnitude) corresponding to the touch input, may be output through the second wires 232 in a first mode. Further, signals (e.g., resistance variation corresponding to the touch input, such as a difference in resistance value) may be output through the second wires 232 in a second mode.

Also, referring to FIGS. 4 and 5, a direction in which a line forming each first electrode 221 is wound may be opposite to a direction in which a line forming each second electrode 222 is wound.

For example, when the line forming the first electrode 221 has a shape in which it is wound counterclockwise from the first center portion 221a to a point coupled to the corresponding first wire 231, the line forming the second electrode 222 may have a shape in which it is wound clockwise.

In this case, when the first electrode 221 and the second electrode 222 are driven in the first mode, current flowing through the first electrode 221 and current flowing through the second electrode 222 flow in the same direction (e.g., a clockwise direction), and thus magnetic fluxes may be enhanced (e.g., maximized) without being cancelled.

In the first mode, the first electrodes 221 and the second electrodes 222 may be operated using (or utilizing) any one of various suitable EMR schemes.

For example, when driving signals are applied to the first electrodes 221 and the second electrodes 222, the pen 20 may receive energy for resonance from the first electrodes 221 and the second electrodes 222.

Next, a resonance signal emitted from (resulting from) the resonance circuit 23 of the pen 20 is received through the first electrodes 221 and the second electrodes 222, and thus the location, strength, etc. of a touch input, made by the pen 20, may be determined.

In the second mode, when a touch input having a set or predetermined pressure or strength is made via the display device 10, the lengths or cross-sectional areas of the first electrodes 221 or the second electrodes 222 disposed at the location corresponding to the touch input are changed.

When the lengths and/or cross-sectional areas of the first electrodes 221 and/or the second electrodes 222 are changed, the resistance values of the first electrodes 221 and/or the second electrodes 222 are varied. That is, in the second mode, the location and strength of the touch input may be calculated using (or utilizing) the variation in the resistance values.

Although, in FIGS. 4 to 6, the first electrodes 221 and the second electrodes 222 are illustrated as being respectively disposed on opposite surfaces of the substrate 210, the configuration of the present disclosure is not limited thereto. For example, after the first electrodes 221 and the second electrodes 222 have been formed on separate substrates, respectively, they may be coupled to each other in various suitable manners.

Figure 7:
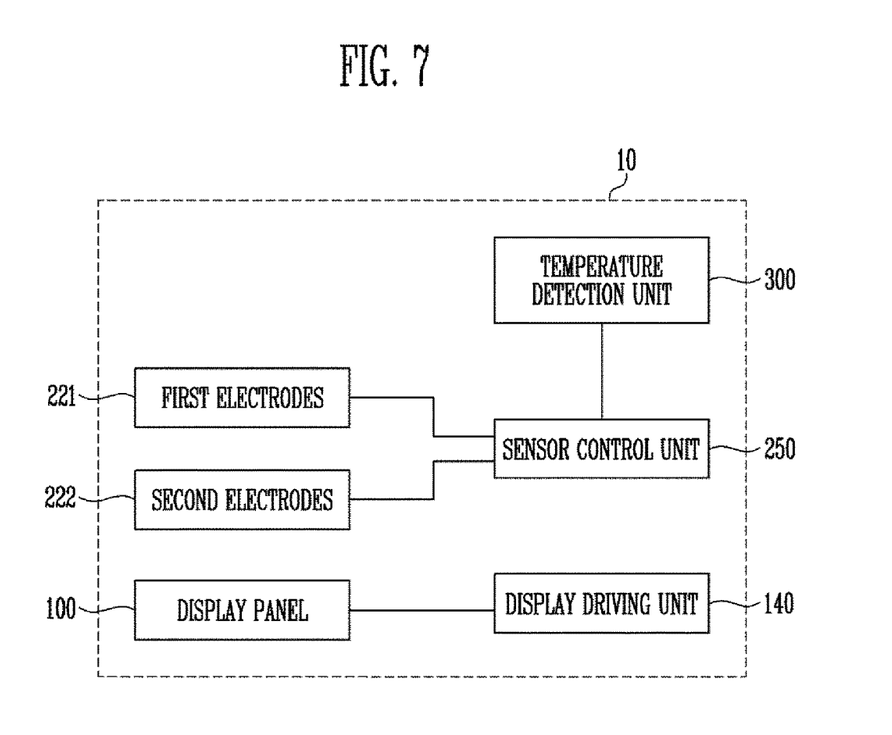
FIG. 7 is a diagram illustrating a display device according to an embodiment of the present disclosure.

FIG. 7 is a diagram illustrating a display device including a display driving unit, a sensor control unit, and a temperature control (e.g., detection and control) unit according to an embodiment of the present disclosure.

Referring to FIG. 7, the display device 10 according to an embodiment of the present disclosure may further include a display driving unit 140, a sensor control unit 250, and a temperature control unit 300.

The display driving unit 140 may control an image display operation of the display panel 100 by supplying image driving signals to the display panel 100.

For this operation, the display driving unit 140 may generate the image driving signals using (or utilizing) image data and control signals which are externally supplied.

For example, the display driving unit 140 may be supplied with the image data and the control signals from a host, wherein the control signals may include a vertical synchronization signal, a horizontal synchronization signal, a main clock signal, etc.

Further, the image driving signals may include data signals, etc., which are generated using (or utilizing) scan signals and the image data.

The sensor control unit 250 may supply driving signals to the first electrodes 221 through the first wires 231. For this operation, the sensor control unit 250 may be coupled to the first pads 241.

The sensor control unit 250 may supply the same driving signals in a first mode and in a second mode, or may supply different driving signals in respective modes.

The sensor control unit 250 may acquire sensing signals output from the second wires 232.

In the first mode, the sensor control unit 250 may detect (or calculate) the location and strength of a touch input made by the pen 20 with reference to a resonance signal, which is reflected (e.g., embedded or carried) in the sensing signals output from the second wires 232.

Further, in the second mode, the sensor control unit 250 may detect (or calculate) the location and strength of a touch input with reference to resistance variation, which is reflected (e.g., embedded or carried) in the sensing signals output from the second wires 232.

When the sensor control unit 250 applies the same driving signals in the first mode and in the second mode, a change in the driving signals attributable to the resonance signal may be much greater than a change in the driving signals attributable to the resistance variation.

Therefore, a touch input made by the pen 20 and a touch input made by a finger may be distinguished from each other in the first mode. In the first mode, only the touch input made by the pen 20 may be recognized as a valid touch input.

The temperature control unit 300 may function to sense the temperature of the surrounding environment of the display device 10, the temperature of the display device 10 itself, the temperature of the touch sensor 200 or the temperature of the first and second electrodes 221 and 222, and to output signals corresponding to the sensed temperatures.

The resistances of the first electrodes 221 and the second electrodes 222 may be varied by the temperature, as well as by the lengths or cross-sectional areas of the first electrodes 221 and the second electrodes 222. For example, when the temperature rises, the resistances of the first electrodes 221 and the second electrodes 222 may be increased, whereas when the temperature falls, the resistances of the first electrodes 221 and the second electrodes 222 may be decreased.

When the resistances are varied with the temperature, the sensor control unit 250 may determine that a touch input has been made even if the touch input is not actually made.

In order to solve this problem, the sensor control unit 250 may determine the location of a touch input with reference to the sensing signals acquired through the second wires 232 and the signal output from the temperature control unit 300. That is, the sensor control unit 250 may determine whether a touch input has been made taking in consideration the effect of the temperature (e.g., the sensor control unit 250 may determine whether a touch input has been made after making corrections for the temperature effect).

In accordance with the present disclosure, when a touch input has been made by a pen, the touch input may be sensed using (or utilizing) a resonance signal, whereas when a touch input is made by a finger, the touch input may be sensed using (or utilizing) resistance variation attributable to a pressure.

Expressions such as "at least one of," when preceding a list of elements, modify the entire list of elements and do not modify the individual elements of the list. Further, the use of "may" when describing embodiments of the inventive concept refers to "one or more embodiments of the inventive concept."

The terminology used herein is for the purpose of describing particular example embodiments only and is not intended to be limiting of the invention. As used herein, the singular forms "a," and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments have been disclosed herein, and although specific terms are employed, they are used (or utilized) and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used (or utilized) singly or in combination with features, characteristics, and/ or elements described in connection with other embodiments unless otherwise specifically indicated. Accordingly, it will be understood by those of skill in the art that various changes in form and details may be made without departing from the spirit and scope of the present invention as set forth in the following claims, and equivalent thereof.

What is claimed is:

1. A touch sensor, comprising:
 a substrate having a first surface and a second surface opposite the first surface;
 a plurality of first electrodes on the first surface of the substrate;
 a plurality of second electrodes on the second surface of the substrate;
 a plurality of coupling parts including a conductive material filled in a hole formed in the substrate and configured to couple the plurality of first electrodes to the plurality of second electrodes, respectively;
 a plurality of first wires on the first surface of the substrate and coupled to the plurality of first electrodes, respectively;
 a plurality of second wires on the second surface of the substrate and coupled to the plurality of second electrodes, respectively; and
 a sensor control unit electrically connected to the plurality of first electrodes and the plurality of second electrodes and configured to calculate a location of a touch with reference to a resonance signal comprising a resonance frequency and/or a resonance magnitude, the resonance signal being received through the plurality of first electrodes and the plurality of second electrodes and output to the sensor control unit through the second wires in a first mode, and with reference to a resistance variation of the plurality of first electrodes and the plurality of second electrodes in a second mode, wherein each of the first electrodes and the second electrodes has a spirally wound shape, wherein the sensor control unit is to acquire both the resonance signal in the first mode and the resistance variation in the second mode, wherein each of the plurality of first electrodes has a shape in which the first electrode is wound from a first center portion in a first rotation direction, wherein each of the plurality of second electrodes has a shape in which the second electrode is wound from a second center portion in a second rotation direction opposite to the first rotation direction, the second center portion overlapping with the first center portion in a plan view, and wherein each of the plurality of coupling parts including the conductive material extends from the first surface to the second surface of the substrate in a thickness direction crossing the first surface and the second surface of the substrate to contact a respective one of the first electrodes and contact a respective one of the second electrodes.

2. The touch sensor according to claim 1, wherein the first electrodes and the second electrodes coupled to each other through the plurality of coupling parts, respectively, overlap each other.

3. The touch sensor according to claim 1, wherein the plurality of coupling parts are configured to couple the first center portions of the plurality of first electrodes to the second center portions of the plurality of second electrodes, respectively.

4. The touch sensor according to claim 1, wherein the sensor control unit is further configured to supply driving signals to the plurality of first wires and acquire sensing signals from the plurality of second wires, calculate the location of the touch with reference to the resonance signal reflected in the sensing signals in the first mode, and calculate the location of the touch with reference to the resistance variation reflected in the sensing signals in the second mode.

5. The touch sensor according to claim 4, wherein, when the driving signals are applied to the plurality of first wires, a direction of current flowing through each of the plurality of first electrodes is the same as a direction of current flowing through each of the plurality of second electrodes.

6. The touch sensor according to claim 1, wherein at least one of the first electrodes or the second electrodes has a resistance value that changes in response to pressure.

7. A touch sensing system, comprising:
a pen comprising a resonance circuit; and
a touch sensor configured to sense a touch made by the pen, wherein the touch sensor comprises:
a plurality of first electrodes on a first surface of a substrate;
a plurality of second electrodes on a second surface of the substrate opposite the first surface;
a plurality of coupling parts including a conductive material filled in a hole formed in the substrate and configured to couple the plurality of first electrodes to the plurality of second electrodes, respectively;
a plurality of first wires on the first surface of the substrate and coupled to the plurality of first electrodes, respectively;
a plurality of second wires on the second surface of the substrate and coupled to the plurality of second electrodes, respectively; and
a sensor control unit electrically connected to the plurality of first electrodes and the plurality of second electrodes and configured to calculate a location of the touch with reference to a resonance signal emitted from the pen, the resonance signal comprising a resonance frequency and/or a resonance magnitude, and being received through the plurality of first electrodes and the plurality of second electrodes and output to the sensor control unit through the second wires in a first mode, and with reference to a resistance variation of the plurality of first electrodes and the plurality of second electrodes in a second mode, wherein each of the first electrodes and the second electrodes has a spirally wound shape, wherein the sensor control unit is to acquire both the resonance signal in the first mode and the resistance variation in the second mode, wherein each of the plurality of first electrodes has a shape in which the first electrode is wound from a first center portion in a first rotation direction, and wherein each of the plurality of second electrodes has a shape in which the second electrode is wound from a second center portion in a second rotation direction opposite to the first rotation direction, the second center portion overlapping with the first center portion in a plan view, and wherein each of the plurality of coupling parts including the conductive material extends from the first surface to the second surface of the substrate in a thickness direction crossing the first surface and the second surface of the substrate to contact a respective one of the first electrodes and contact a respective one of the second electrodes.

8. The touch sensing system according to claim 7, wherein the touch sensor is configured to operate in the first mode when a touch input is made by the pen and to operate in the second mode when the touch input is made by an object other than the pen.

9. The touch sensing system according to claim 8, wherein, in the first mode, each of the plurality of first electrodes and the plurality of second electrodes transmits energy for allowing the resonance circuit to resonate to the pen.

10. The touch sensing system according to claim 8, wherein, in the second mode, each of the plurality of first electrodes and the plurality of second electrodes functions as a strain gauge.

11. The touch sensing system according to claim 8, wherein the first electrodes and the second electrodes coupled to each other through the plurality of coupling parts, respectively, overlap each other.

12. The touch sensing system according to claim 8, wherein the sensor control unit is further configured to supply driving signals to the plurality of first wires and acquire sensing signals from the plurality of second wires, calculate the location of the touch with reference to the resonance signal reflected in the sensing signals in the first mode, and calculate the location of the touch with reference to the resistance variation reflected in the sensing signals in the second mode.

13. The touch sensing system according to claim 12, wherein a direction of current flowing through each of the plurality of first electrodes is the same as a direction of current flowing through each of the plurality of second electrodes.

14. The touch sensing system according to claim 12, wherein the sensor control unit is configured to determine whether the touch input has been made in the second mode after making corrections for a temperature effect.

* * * * *